Jan. 6, 1953  G. P. DAIGER  2,624,824
TOASTING APPARATUS
Filed July 13, 1948
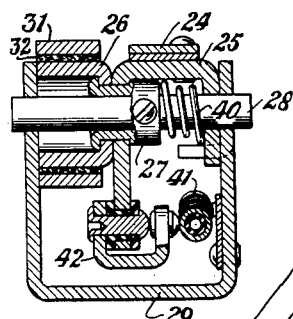
Fig. 2
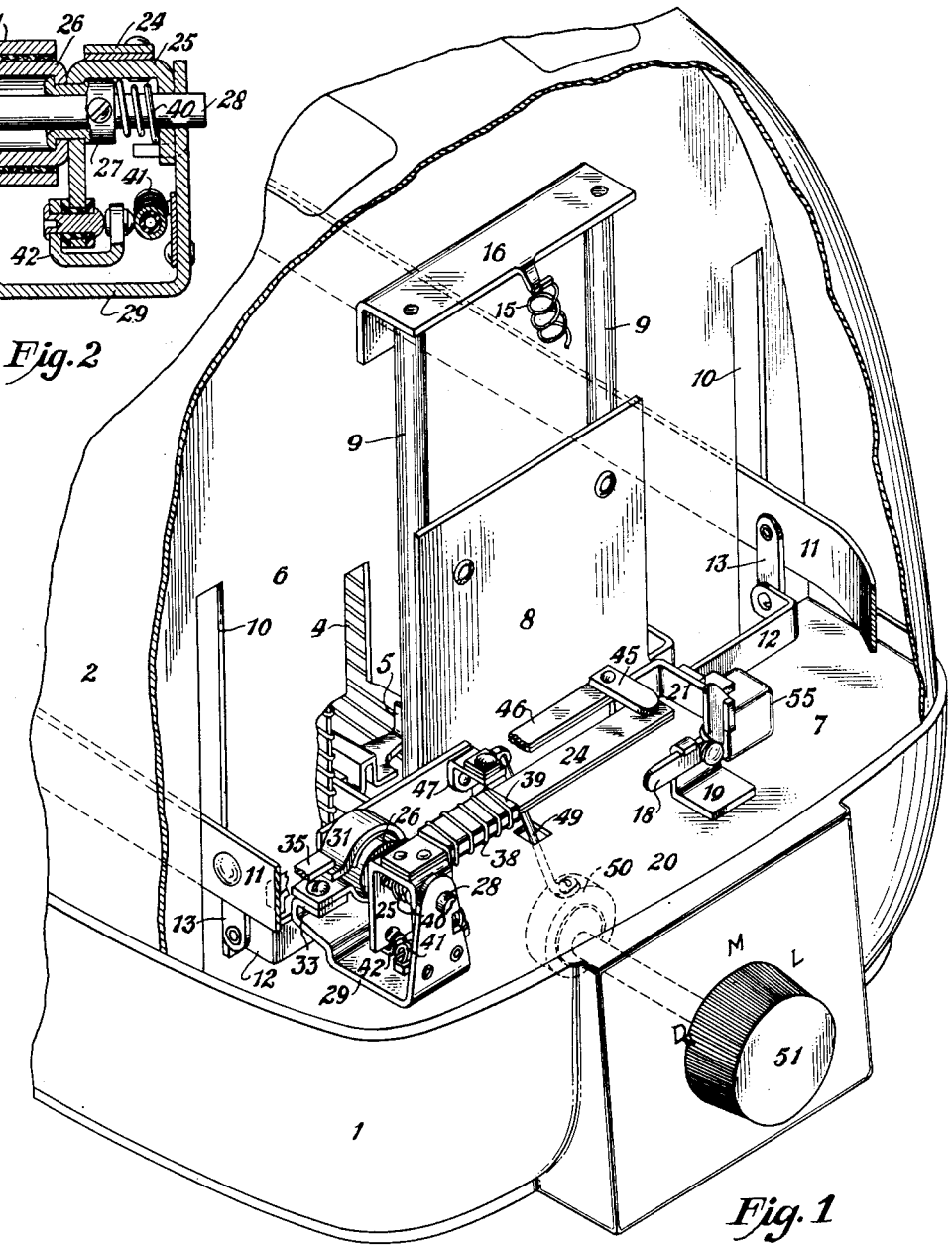
Fig. 1
Fig. 3
INVENTOR.
George P. Daiger
BY Harry S.
ATTORNEY.

Patented Jan. 6, 1953

2,624,824

UNITED STATES PATENT OFFICE 2,624,824

TOASTING APPARATUS

George P. Daiger, Canton, Ohio, assignor to The Hoover Company, North Canton, Ohio, a corporation of Ohio Application July 13, 1948, Serial No. 38,411

14 Claims. (Cl. 219—19)

The present invention relates to cooking devices and more particularly to a novel device especially adapted for toasting bread.

Toasters generally are provided with an oven containing a heating element and a mechanism arranged to time the toasting period and to de-energize the heating element at the end of that period. In general, such apparatuses are timed by various forms of thermal mechanisms such as a bimetallic element. When the toaster is initially placed in operation it starts from room temperature and requires a considerable period of time to come up to the temperature at which toasting actually begins. As a result the first toasting period is comparatively long, 120 seconds for example. If the toaster is operated shortly after a preceding toasting period, the time required to toast the bread to the same degree of brownness is appreciably shortened because of the initial high temperature of the oven. This shortening of the time period required for the toasting operation will occur for several cycles, assuming the toaster is re-cycled as fast as the operator can remove the toasted bread and replace it with fresh bread to be toasted, until a condition of equilibrium is reached after which the toasting periods are of uniform duration. The number of cycles required to reach this equilibrium condition will vary with different toasters depending upon numerous design features but is readily determinable for any particular design.

The thermostatic elements customarily used for timing such toasting apparatuses are effective only when employed with compensating arrangements because thermostatic elements tend to shorten sequential toasting periods to too great an extent, that is, they over-compensate.

It is an object of the present invention to provide a timing mechanism in which the space position of the thermal element of the toaster is constantly reset during periods between cycles so that the movable or expansible portion of the thermal element always initiates a toasting cycle from a fixed position in space, that is, the thermal element must traverse some predetermined distance on each toasting cycle in order to terminate the same.

It is a further object of the present invention to provide a toaster timer in which the thermostatic element is heated to progressively higher temperatures during sequential toasting periods to compensate for the increasing temperature of the toasting oven.

It is a further object of the invention to provide a toaster timing mechanism in which the thermostat is released from a locking mechanism at the termination of each toasting period and is then spring urged in a direction to maintain a predetermined relationship between the thermal mechanism and the release latch during the intervals between toasting periods.

Other objects and advantages of the invention will become apparent as the description proceeds when taken in connection with the accompanying drawing in which:

Figure 1 is a perspective view with parts of the front portion of the toaster broken away to show the control mechanism and its chamber;

Figure 2 is a sectional view of a portion of the apparatus of Figure 1 shown on an enlarged scale; and Figure 3 is a schematic wiring diagram of the electrical connections of the apparatus.

The toasting apparatus and timing mechanism disclosed and claimed in this application is related to the toasting apparatus and timing mechanism disclosed and claimed in the copending applications of Harry B. White, Serial No. 38,531, now Patent No. 2,585,885, and Serial No. 38,532, now Patent No. 2,594,528, filed July 13, 1948, and assigned to the assignee of this application.

Referring now to the drawing in detail and first to Figure 1 thereof, the toasting mechanism comprises the usual base 1 which is secured to a cover shell 2 enclosing the toasting ovens which are heated by electrical heating elements 4 positioned on opposite sides of toast supporting racks 5 within the oven. A partition wall 6 separates the toasting oven from a control chamber 7 formed between the partition wall 6 and the end wall of the cover shell 2. The toast supporting racks 5 may be of any desired type however as illustrated they are secured to a guide plate 8 which is slidably mounted upon a pair of guide posts 9 mounted within the chamber 7 upon the partition wall 6. The partition wall 6 is provided with spaced slots 10 which receive long carriage actuating arms 11 pivoted in any desired manner adjacent the end of the toaster remote from chamber 7. The arms 11 are mechanically connected to the guide plate 8 through bracket arms 12 and pivoted links 13. The forward ends of the arms 11, not shown, follow the inside curvature of the cover shell 2 and have joined ends extending through the front slot in the shell 2 to support an operating handle for actuating the toast carriage in a conventional manner. The usual spring 15 is connected between the joined ends of the arms 11, not shown, and a bracket 16, which is secured to the partition 6, so as to urge the arms 11 and hence the toast carriage into upper, toast ejecting position.

The timing and control mechanism for the toaster includes a spring latch element 18 in the form of a bell crank pivotally mounted upon a lug 19 secured to the bottom plate 20 of the chamber 7. The latch 18 is spring urged to engage a keeper bar 21 secured to the guide plate 9 for the toast supporting rack. When the arms 11 are operated to lower the toast carriage to toasting position the keeper bar 21 rides over the latch 18 and is secured thereby to hold the carriage in lower, toasting position.

The timing element is a bimetallic thermostat 24 having one end secured to a U-shaped bracket 25 (see Fig. 2). The bracket 25 is secured to a cup-shaped brake drum 26 by means of a combined rivet and collar element 27. The assembly comprising the thermostat 24, U-shaped mounting 25, brake drum 26 and collar 27 are mounted upon a shaft 28 and are secured thereto by the collar portion of the rivet and collar assembly 27. The shaft 28 is pivotally mounted in a U-shaped bracket 29 which is permanently secured to the base plate 20 of the compartment 7. The brake drum 26 is surrounded by a spring metal brake band 31 provided with a friction lining 32. One end of the brake band 31 is secured to an ear 33 on the bracket 29. The other end of the brake band 31 is positioned to be engaged by a lug 35 carried by the left hand arm 11, as viewed in Fig. 1, of the carriage structure 8. The arrangement is such that the lug 35 contracts the brake band 31 and causes the same to engage the drum 26 to prevent rotation of the thermostat mounting structure when the carriage is latched in toasting position.

An auxiliary heating element 38 is wound around a portion of the bimetallic thermostat 24 adjacent the point at which it is mounted on the U-shaped bracket 25 and is insulated therefrom by suitable insulating material 39.

A torsion spring 40 is wound around the spindle 28 and urges the brake drum, U-shaped support 25, and thermostat 24 in a counter-clockwise direction as viewed in Figure 1 for a purpose to be described hereinafter.

When heat is applied to the thermostat 24 it deflects downwardly, as viewed in Figure 1, into engagement with the bell crank latch 18 so as to unlatch the toast supporting carriage and permit the same to be raised to toast ejecting position under the bias of spring 15 at the termination of a toasting period.

A resistance type rheostat 41 is insulatably mounted on the inside of the bracket 29 to be contacted by a slider arm 42 carried by the thermostat bracket 25. The contact arm 42 is insulatably mounted upon one leg of the U-shaped bracket 25 and is provided with a flexible electrical connector 43 for connecting in circuit in a manner to be described hereinafter.

The spring 40 urges the free end of the bimetallic element 24 into contact with a stop 45 mounted upon the end of a compensating bimetallic thermostat 46 which is supported on a plate 47. The plate 47 is pivotally mounted upon an extended portion of bracket 29. A drive link 49 connects the plate 47 with an eccentric cam 50 adjustable by means of a manually operable dial 51 mounted upon the exterior of the toaster housing. Rotation of the dial 51 raises and lowers the link 49 and through its actions raises and lowers the thermostat 46 and stop 45 to adjust the toaster for light, dark and medium toast in a manner to be described more fully hereinafter.

A control switch 55 is mounted upon the bottom plate 20, see Figure 1, of the control chamber 7 and is spring biased to open circuit position. The switch is closed by a lug mounted on the side of keeper bar 21 when the carriage is latched in toasting position.

Referring now to Figure 3, the electrical connections of the apparatus are schematically illustrated. One line 54 of the electrical supply system connects to the control switch 55. The switch 55 is connected to the main heating element 4 by a conductor 56 and to the auxiliary heating element 38 by a conductor 57. The other line connection 58 connects to the heater 4 and to the flexible connector 43 and swinging arm 42 of the rheostat. The free end of the rheostat 41 is connected by a conductor 59 to the auxiliary heating element 38 of the thermostat. Thus the main heater is parallel connected across the line with the series connected rheostat and auxiliary heater.

The operation of this form of the invention is as follows. Assuming that the toaster has not previously been operated and that all parts thereof are substantially at room temperature, the parts will appear as indicated in Figure 1 just after the toast carriage has been latched in toasting position. The main and auxiliary heaters are energized and the brake 31 is set to lock the thermostatic mechanism. The thermostat flexes downwardly as it is heated until it contacts the latch 18 and releases the carriage to terminate the toasting cycle. When the carriage rises the brake is released and the spring 40 swings the still hot and flexed thermostat upwardly into engagement with the stop 45. When the heating element 38 is de-energized the thermostatic element 24 begins to cool and tends to flex backwardly into its normal straight position as illustrated in Figure 1. If a second toasting cycle is begun a short period of time following the initial cycle the brake band 31 will be locked again with the bracket 25 displaced from its initial position and with the thermostatic element 24 bowed to some extent due to its residual heat. The thermostat will now start the toasting period from a higher temperature level and will be heated at a higher rate as the displacement of the slider 42 with the thermostat has decreased the amount of resistance in circuit. The thermostat must flex through the same arc of movement as before in order to release the latch on the second toasting cycle. The foregoing is subject to modification by the bimetallic element 46 which moves the stop 45 closer to the release latch 18 as the ambient temperature within the compartment 7 increases and thus shortens the movement required of the thermostat to compensate for the shortening toasting period as the oven temperature progressively increases due to sequential operation of the toaster.

With an arrangement of thermostat and heating element such as that illustrated in Figure 1 of the drawing it is very difficult to avoid approaching equilibrium between the heat input to the thermostat by the heating element and the heat rejection thereof into the compartment 7 during the long first toasting period. In order to correct this factor the rheostat 41—42 is provided. This element allows the small light bimetal to approach equilibrium with its heating element for several cycles but the progressive increase in heating rate insures that the thermostat will always be heated sufficiently during each toasting period to operate the release latch. The heating rate of the thermostat increases for several cycles to heat the thermostat to progressively higher temperatures until the toasting oven is stabilized so that its temperature does not tend to become progressively higher on succeeding toasting cycles. When this condition is reached the thermostatic element 24 is operating in a high temperature range and its heat rejection rate is high even though the ambient in the chamber 7 is at an elevated point. When stabilized conditions are reached the thermostat 46 is flexed to an appreciable degree, hence the thermostat 24 is required to increase its degree of flexure, that is, increase its temperature, during any toasting period only a comparatively small amount to operate the carriage release latch. Under these conditions the thermostat temperature is above the control chamber ambient an amount sufficient to allow the thermostat to cool in a matter of a few seconds through the temperature range through which it was heated during the immediately preceding toasting period. The thermostat thus times succeeding toasting periods equally when the above specified equilibrium conditions prevail.

The position of the stop lug 45 is adjustable as described hereinabove by the dial 51 to change the character of the toast being prepared by the toasting apparatus. Thus the distance which the end of the thermostat 24 must travel on each toasting cycle is varied both by the ambient temperature compensating thermostat 46 and by the light and dark adjustment dial 51.

The present invention provides a toaster timing mechanism which effectively controls the apparatus to compensate for varying oven temperature conditions. This apparatus produces toast of uniform quality regardless of the temperature of the oven at the beginning of the toasting period. The apparatus essentially comprises a mechanism which requires the operating portion of the thermostat to begin each timing period from a predetermined position. The spaced position of the aforesaid predetermined position is varied in accordance with the toaster ambient to decrease the arc of movement of the thermostat progressively as the oven temperature progressively rises. The heating rate during any toasting period is determined by the initial flexure, that is, temperature of the thermostat. By this means the increasing heating rate positively insures that adequate energy will be available to increase the temperature of the thermostat to the desired amount during any toasting period. The ambient compensator by shortening the movement required of the thermostat effectively shortens up toasting periods as the oven temperature increases, that is, it progressively reduces the range through which the thermostat must be heated to operate the latch therefore the higher the temperature of the thermostat the lower the range through which it must be heated and the greater the rate at which it will reject heat in the intervals between toasting periods to restore itself to its initial condition.

While I have illustrated and described the invention in considerable detail, it is to be understood that various changes may be made in the arrangement, proportion and construction of parts without departing from the spirit of the invention or the scope of the appended claims.

I claim:

1. A toaster comprising an oven, means for heating said oven, a thermostat, a heater for said thermostat, means movably mounting said thermostat, a stop, means biasing said thermostat against said stop, means for energizing said heating means and said heater, a brake arranged to secure said thermostat against the action of said biasing means, means for operating said energizing means to initiate a toasting cycle and to set said brake and means operated by said thermostat responding to the application of heat thereto for releasing said brake and for deenergizing said heater and said heating means.

2. Toaster timing mechanism comprising a latch mechanism, movable means having a toasting position in which it is secured by said latch mechanism and a non-toasting position in which it is free of said latch mechanism, means biasing said movable means to non-toasting position, a thermostatic means having a part movable under the influence of heat to release said latch mechanism, means for heating said thermostatic means, means for energizing said heating means when said movable means is in toasting position, means mounting said thermostatic means for pivotal movement, stop means, means biasing said thermostatic means for pivotal movement against said stop in a direction to counter heat induced movement of said part in a direction to release said latch mechanism, a brake biased to released position arranged when set to secure said thermostatic mechanism against said pivotal movement, and means operable to set said brake when said movable means is latched in toasting position.

3. Toaster timing mechanism comprising a latch mechanism, movable means having a toasting position in which it is secured by said latch mechanism and a non-toasting position in which it is free of said latch mechanism, means biasing said movable means to non-toasting position, a thermostatic means having a part movable under the influence of heat to release said latch mechanism, means for heating said thermostatic means, means for energizing said heating means when said movable means is in toasting position, means mounting said thermostatic means for pivotal movement, stop means, means biasing said thermostatic means for pivotal movement against said stop in a direction to counter heat induced movement of said part in a direction to release said latch mechanism, a brake biased to released position arranged when set to secure said thermostatic mechanism against said pivotal movement, and means operable to set said brake when said movable means is latched in toasting position and manually settable means for varying the position of said stop to vary the duration of the toasting periods.

4. Toaster timing mechanism comprising a latch mechanism, movable means having a toasting position in which it is secured by said latch mechanism and a non-toasting position in which it is free of said latch mechanism, means biasing said movable means to non-toasting position, a thermostatic means having a part movable under the influence of heat to release said latch mechanism, means for heating said thermostatic means, means for energizing said heating means when said movable means is in toasting position, means mounting said thermostatic means for pivotal movement, stop means, means biasing said thermostatic means for pivotal movement against said stop in a direction to counter heat induced movement of said part in a direction to release said latch mechanism, a brake biased to released position arranged when set to secure said thermostatic mechanism against said pivotal movement, and means operable to set said brake when said movable means is latched in toasting position and means for increasing and decreasing the intensity of the heating effect produced by said heating means proportionately to progressive increase or decrease in the temperature of said thermostatic means as sequential toasting periods are initiated.

5. Toaster timing mechanism comprising a latch mechanism, movable means having a toasting position in which it is secured by said latch mechanism and a non-toasting position in which it is free of said latch mechanism, means biasing said movable means to non-toasting position, a thermostatic means having a part movable under the influence of heat to release said latch mechanism, means for heating said thermostatic means, means for energizing said heating means when said movable means is in toasting position, means mounting said thermostatic means for pivotal movement, stop means, means biasing said thermostatic means for pivotal movement against said stop in a direction to counter heat induced movement of said part in a direction to release said latch mechanism, a brake biased to released position arranged when set to secure said thermostatic mechanism against said pivotal movement, and means operable to set said brake when said movable means is latched in toasting position and means for increasing the intensity of the heating effect produced by said heating means during each toasting period proportionately to the degree of pivotal movement of said thermostatic means at the beginning of each toasting period.

6. Toaster timing mechanism comprising a latch mechanism, movable means having a toasting position in which it is secured by said latch mechanism and a non-toasting position in which it is free of said latch mechanism, means biasing said movable means to non-toasting position, a thermostatic means having a part movable under the influence of heat to release said latch mechanism, means for heating said thermostatic means, means for energizing said heating means when said movable means is in toasting position, means mounting said thermostatic means for pivotal movement, stop means, means biasing said thermostatic means for pivotal movement against said stop in a direction to counter heat induced movement of said part in a direction to release said latch mechanism, a brake biased to released position arranged when set to secure said thermostatic mechanism against said pivotal movement, and means operable to set said brake when said movable means is latched in toasting position and means having a part arranged to move with said thermostatic means when moved by said biasing means for varying the intensity of the heating effect produced by said heating means proportionately to the temperature of said thermostatic means.

7. A toaster timer comprising a latch mechanism, movable means having a toasting position in which it is secured by said latch mechanism and a non-toasting position in which it is free of said latch mechanism, means biasing said movable means to non-toasting position, a bimetal having one end positioned to engage said latch mechanism to release said movable means when said bimetal is flexed by heat, means for heating said bimetal, means pivotally mounting the other end of said bimetal, a stop, means biasing said bimetal to pivot said one end thereof away from said latch mechanism into engagement with said stop, a brake on said pivotal mounting means arranged when set to prevent pivotal movement of said bimetal and biased to unset position, and means for moving said movable means to toasting position and for setting said brake and for energizing said heating means.

8. In a toaster, an oven, means for heating said oven, means for energizing said heating means to initiate a toasting operation, a control mechanism for timing a toasting operation comprising a motion transmitting mechanical train composed of a plurality of members including an actuating thermostatic member deformable by changes in its temperature and an actuated toasting operation terminating member, means for moving one of the members of said train relative to other members thereof to establish a relation therebetween requiring a predetermined deformation of said thermostatic member during toasting operation to actuate said train, a brake arranged when set to lock said relatively movable members in said predetermined relation, and means operated by said energizing means for setting said brake during toasting operation.

9. Timing mechanism comprising: a plurality of members forming a motion transmitting mechanical train including, a terminating member to be actuated at the end of a timing period, a thermostatic member deformable in response to the changes in its temperature to actuate said terminating member, a releasable and engageable connection between two members of said train operative when released to allow movement of one of said members without actuating said terminating member, and means for moving said one of said members when said connection is released according to the deformation of said thermostatic member to require a predetermined deformation of said thermostatic member during a timing operation to actuate said terminating member; means for heating said thermostatic member, and means for energizing said heating means and for engaging said connection during a timing operation.

10. In a toaster, an oven, means for heating said oven, means movable between toasting and non-toasting positions, means biasing said movable means to non-toasting position, a plurality of members forming a mechanical train for timing a toasting operation including a terminating member for holding said movable means in toasting position, a thermostatic member deformable by heat to actuate said train to operate said terminating member to release said movable means, means for heating said thermostatic member, means forming a releasable and engageable connection between two of said members of said train operative when released to allow thermal deformation of said thermostatic member without actuating said train, and means operated by said movable means when in toasting position for engaging said connection and for energizing said heating means.

11. In a toaster, an oven, means for heating said oven, means movable between toasting and non-toasting positions, means biasing said movable means to non-toasting position; a plurality of members forming a mechanical train for timing a toasting operation including, a holding member for retaining said movable means in toasting position and operable to release said movable means, a thermostatic member for actuating said train to operate said holding member to release said movable means, means forming a releasable and engageable connection between two of said members of said train operative when released to allow movement of one of said two members relative to the other thereof without actuating said train, and means for moving said one of said members according to the deformation of said thermostatic members to require a predetermined deformation of said thermostatic member during a toasting operation to operate said train to release said movable means, and means operated by said movable means when in toasting position for engaging said connection to secure said two members against said relative movement.

12. In a toaster, an oven, a heater for said oven, means controlling the energization of said heater movable between heater energizing and heater de-energizing positions, a plurality of members forming a mechanical train for timing a toasting operation including, a holding member for retaining said movable means in heater energizing position, a thermostatic member deformable by heat for actuating said train to operate said holding member to release said movable means, means for moving one of said members relative to another of said members according to the deformation of said thermostatic member without actuating said train to establish a predetermined relation between said holding member and said thermostatic member, and means operated by said movable means in heater energizing position for rendering inoperative said means for moving said one member.

13 In a toaster, an oven, a heater for said oven, means movable between toasting and non-toasting positions, means biasing said movable means to non-toasting position; a plurality of members forming a mechanical train for timing a toasting operation including, a holding member for retaining said movable means in toasting position and operable to release said movable means, a thermostatic member for actuating said train to operate said holding member to release said movable means, means forming a releasable and engageable connection between two of said members of said train operative when released to allow movement of one of said two members relative to the other thereof without actuating said train, and means for moving said one of said members according to the deformation of said thermostatic members to require a predetermined deformation of said thermostatic member during a toasting operation to operate said train to release said movable means, means for heating said thermostatic member, means operated by movement of said one of said two members for varying the rate at which said thermostatic member is heated in proportion to the thermal condition thereof, and means operated by said movable means when in toasting position for engaging said connection to secure said two members against said relative movement and for energizing said heating means.

14. In a toaster, an oven, a heater for said oven, means movable between toasting and non-toasting positions, means biasing said movable means to non-toasting position; a plurality of members forming a mechanical train for timing a toasting operation including, a holding member for retaining said movable means in toasting position and operable to release said movable means, a thermostatic member for actuating said train to operate said holding member to release said movable means, means forming a releasable and engageable connection between two of said members of said train operative when released to allow movement of one of said two members relative to the other thereof without actuating said train, and means for moving said one of said members according to the deformation of said thermostatic members to require a predetermined deformation of said thermostatic member during a toasting operation to operate said train to release said movable means, manually operated means for moving said one of said two members to vary the deformation of said thermostatic member required to operate said train, means operated by said movable means when in toasting position for engaging said connection to secure said two members against said relative movement.

GEORGE P. DAIGER.

REFERENCES CITED

The following references are of record in the file of this patent:

UNITED STATES PATENTS

| Number | Name | Date |
| --- | --- | --- |
| Re. 18,923 | Harris | Aug. 22, 1933 |
| 1,289,617 | Berry | Dec. 31, 1918 |
| 1,908,683 | Browning | May 16, 1933 |
| 2,195,638 | Anderson | Apr. 2, 1940 |
| 2,197,221 | Koci | Apr. 16, 1940 |
| 2,266,024 | Gomersall | Dec. 16, 1941 |
| 2,302,117 | Gomersall | Nov. 17, 1942 |
| 2,557,512 | Padelford | June 19, 1951 |
| 2,574,993 | White | Nov. 13, 1951 |
| 2,585,885 | White | Feb. 12, 1952 |